Oct. 25, 1955 R. K. ILER 2,721,812
QUATERNARY AMMONIUM ORGANO SILANOLATE, PROCESS OF TREATING
A SILICEOUS MATERIAL THEREWITH AND PRODUCT THEREBY
Filed April 1, 1952
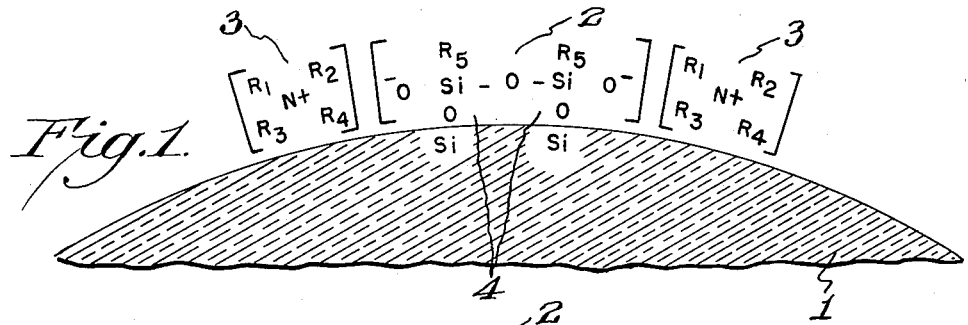
Fig.1.
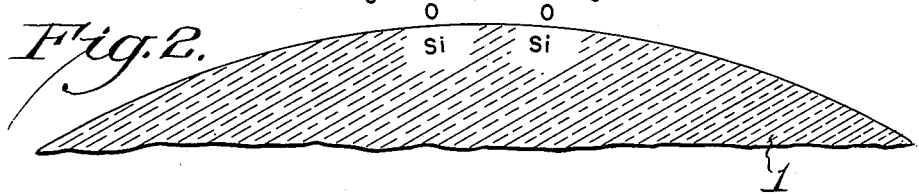
Fig.2.
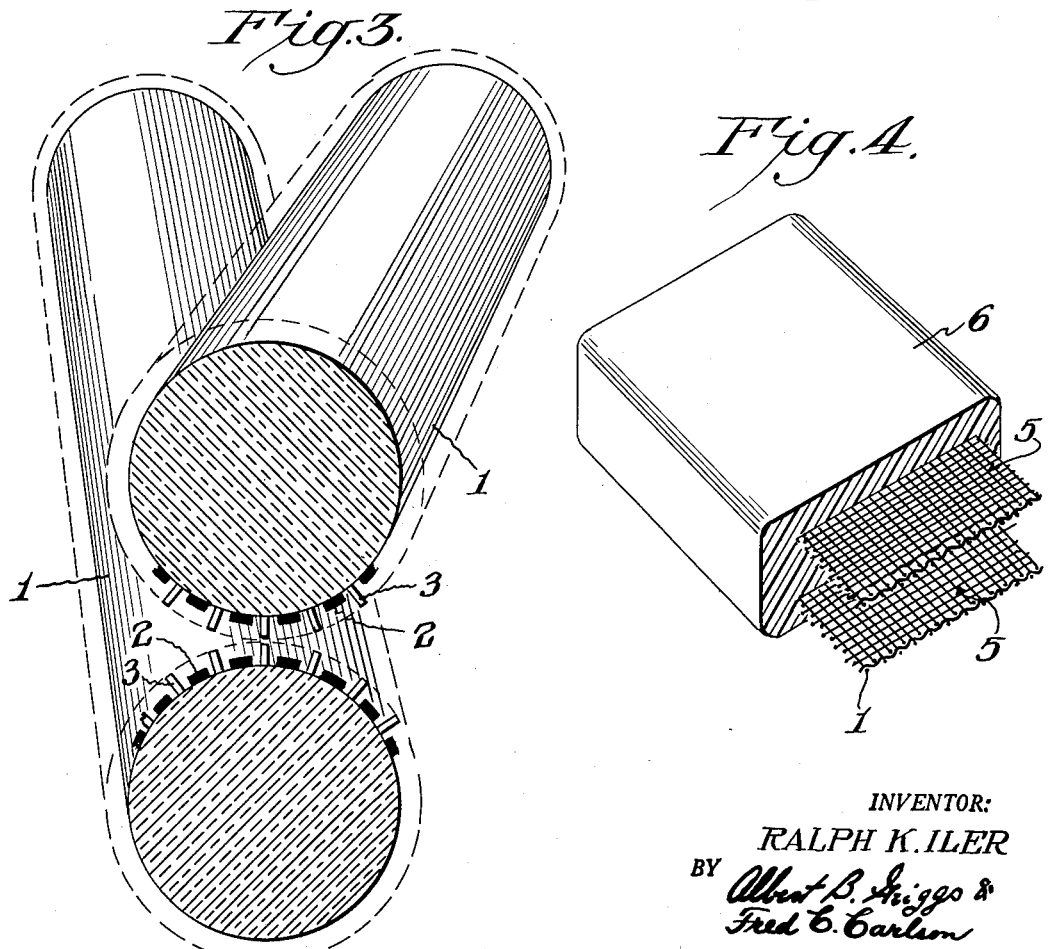
Fig.3.
Fig.4.
INVENTOR:
RALPH K. ILER
BY Albert B. Griggs &
Fred C. Carlson
ATTORNEYS

United States Patent Office 2,721,812
Patented Oct. 25, 1955

2,721,812

QUATERNARY AMMONIUM ORGANO SILANO-LATE, PROCESS OF TREATING A SILICEOUS MATERIAL THEREWITH AND PRODUCT THEREBY

Ralph K. Iler, Brandywine Hundred, Del., assignor to E. I. du Pont de Nemours & Company, Wilmington, Del., a corporation of Delaware Application April 1, 1952, Serial No. 279,907

11 Claims. (Cl. 117—76)

This invention relates to quaternary ammonium organo silanolates, to processes for the treatment of siliceous materials such as glass fibers with them, and to the modified products so obtained.

In the drawings:

Figure 1 is a semi-diagrammatic illustration showing a glass fiber in section which is coated with a quaternary ammonium organo silanolate according to the invention, and Figure 2 shows the modification effected by heating a surface such as that illustrated in Figure 1, and Figure 3 illustrates in perspective greatly enlarged fibers of glass which have been modified with a coating of a quaternary ammonium silanolate according to the invention, and Figure 4 illustrates a plastic laminate with glass fabric embedded therein and prepared according to the invention.

Considering the invention generally first, quaternary ammonium organo silanolates may be generally represented by the following:

1.

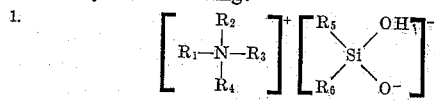

in which, broadly, $R_1$, $R_2$, $R_3$, and $R_4$ are organic groups of types which will be further discussed hereinafter and in which $R_6$ may be hydroxyl or it, as well as $R_5$, may be organic groups of types hereinafter to be described.

The quaternary ammonium organo silanolates of the invention are ionic compounds as illustrated in the formula and range from readily water soluble to difficultly soluble materials. The products may be dispersed in aqueous media and used for a variety of purposes as will be hereinafter described.

In aqueous dispersions and similarly, though more narrowly, in aqueous solutions, the quaternary ammonium organo silanolates polymerize to varying degrees. Such polymerization also occurs when films of the products are dried on surfaces to be treated.

A polymerization of a product as shown in Formula 1 above is illustrated as follows:

2.

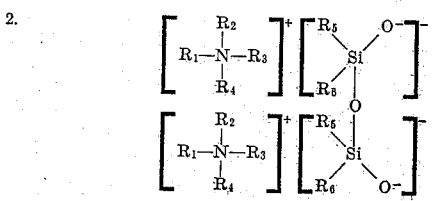

It will be understood that the type of polymerization represented in the above formula may continue in three dimensions and to varying degrees depending upon the basicity of the medium and its state of dehydration.

Products of the invention may be used as will be hereinafter described to treat various types of materials and in Figure 1 of the drawing there is illustrated part of a glass fiber 1 in cross section. On the surface of the fiber there is illustrated a dimer of a silanolate such as that of Formula 2. The silanolate ion is represented at 2 and the quaternary ammonium ions are represented at 3.

It is to be noted that when an aqueous dispersion of a silanolate of the type shown is dried upon a glass surface, there is a bonding between the glass and the silanolate ion. This is illustrated at 4. The quaternary ammonium ions are held to the glass surface which is believed to carry a negative charge. The silanolate groups will ordinarily bond in three dimensions so that the two-dimensional representation shown is by way of diagrammatic illustration. Furthermore, the coating of quaternary ammonium organo silanolate should ideally be present as a monolayer as shown but as a practical matter may be present also as a layer of appreciable thickness.

In the case of mono-organo silanolates there may also be formed in the solution or in a film cyclic silanolate structures as represented in the following:

3.

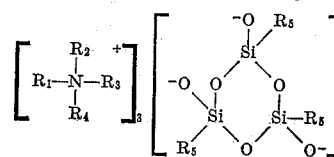

It will be understood that when mono-organo silanolates are present in films as shown in Figure 1 there are three dimensional networks of which the representation in Formula 3 is only schematic.

If a glass fiber as illustrated in Figure 1 is heated sufficiently the quaternary ammonium ions are decomposed and their basicity is destroyed. In Figure 2 the glass substrate of the fiber is again illustrated at 1 and a siloxane group 2 remains, corresponding to the silanolate group of Figure 1. Since positively charged quaternary ammonium ions are no longer present, the negative charge of the silanolate group no longer exists and the silanolate is converted to a siloxane group which is linked through oxygen to the silica substrate. There is thus left upon the surface an organo siloxane coating free from basic materials or other ionic impurities. In most cases the decomposition products of the quaternary ions are volatile and are thus removed from the surface by the heating step.

In Figure 3 of the drawing there is illustrated in perspective, a couple of glass fibers 1 carrying upon their surfaces coatings such as those shown in Figure 1. For purposes of illustration, the anions and cations of Figure 1 are illustrated only at the point of intersection by the squares 2 and 3 respectively. The outline of the surface coating is represented by dotted lines.

The products of Figure 3 have improved characteristics depending upon the specific quaternary ammonium and organo groups present in the silanolates. The surface of the fibers may be lubricated by the groups and protected against mutual abrasion.

In Figure 4 there is illustrated a plastic laminate and there is shown a glass cloth or mat 5 made up of fibers 1. The glass mats are bonded in a plastic 6 to make a glass fiber laminate. The surface of the fibers is coated with a covering of organo siloxane groups 2 as in Figure 2. It can be noted in passing, that in preferred embodiments of the invention, the organo groups on the glass surfaces will be inter-polymerized with the plastic material 6 to effect a chemical bond between the resin and the glass.

Now, considering the invention in greater detail, reference will first be made to the quaternary ammonium ions. Quaternary ammonium compounds are a well known class of materials and in general it may be said that any quaternary ammonium ion may be used. Referring to the Formulas 1, 2, and 3 above $R_1$, $R_2$, $R_3$, and $R_4$ can each be any monovalent organic radical, or two of them taken together may be a divalent organic group, or the compounds can be cyclic and the nitrogen atom can be included in a heterocyclic ring.

While, as indicated, the nitrogen substituents can be any organic groups, it is preferred that the nitrogen valences represented by $R_1$, $R_2$, $R_3$, and $R_4$, be satisfied by unsubstituted hydrocarbon groups of from 1 to 20 carbon atoms. The substituents can be the same or different and if a divalent group is used, it will satisfy two of the valences.

The quaternary ammonium groups can be of the types pyridinium, piperidinium, pyrrolidinium, and quinolinium ions.

As examples of unsubstituted hydrocarbon radicals there can be named such aliphatic groups as:

| | |
|---|---|
| Methyl | Hendecyl |
| Ethyl | Dodecyl |
| Propyl | Tridecyl |
| Butyl | Tetradecyl |
| Pentyl | Pentadecyl |
| Hexyl | Hexadecyl |
| Heptyl | Heptadecyl |
| Octyl | Octadecyl |
| Nonyl | Nonadecyl |
| Decyl | Eicosyl |

Instead of saturated substituents, one can satisfy one of the valences $R_1$, $R_2$, $R_3$, or $R_4$ with an unsaturated group such as the following:

| | |
|---|---|
| Ethenyl | Dodecenyl |
| Propenyl | Tridecenyl |
| Butenyl | Tetradecenyl |
| Pentenyl | Pentadecenyl |
| Hexenyl | Hexadecenyl |
| Heptenyl | Heptadecenyl |
| Octenyl | Octadecenyl |
| Nonenyl | Nonadecenyl |
| Decenyl | Eicosenyl |
| Hendecenyl | |

It will be understood that the substituents or any of them can be cyclic and, for instance, they can be alicyclic. Thus, as a substituent there can be used the cyclohexyl group.

Similarly, the cycloalicyclic compounds can be unsaturated and they can be unsaturated in varying degrees. There can be used, for instance, the 1,3-cyclohexyldienyl group.

In addition to the aliphatic and cycloaliphatic substituents of the character described, one can use aromatic types of substituents in one of the positions under discussion. For instance, one can use:

| | |
|---|---|
| Phenyl | Abietyl |
| Naphthyl | Fluoryl |
| Diphenyl | |

While, as has been indicated, it is preferred to satisfy the valences $R_1$, $R_2$, $R_3$, and $R_4$ with unsubstituted hydrocarbon groups of from one to twenty carbon atoms, one can prepare compounds of the invention by using substituted hydrocarbon groups. It seems hardly necessary to list all of the possible substitutions since such compounds are generally well known as applied to quaternary ammonium salts and since the invention is here not directed primarily to the cation of the molecule.

The groups above described and other organic radicals can be substituted in one or more positions with such groups as fluoro, chloro, alkoxy, nitro, bromo, aryloxy, carboxy, etc.

In employing substituents as above described one skilled in the art will not attempt to put too many long-chain substituents on the nitrogen atom because of the well-known phenomenon of steric hindrance. Thus, with phenyl groups it is more difficult to prepare quaternary ammonium salts with more than one such substituent. Thus it can generally be said that it will ordinarily be desirable to use no more than one aryl group of not more than twenty carbon atoms. Steric hindrance is less of a problem, as is well known, with aliphatic substituents.

The quaternary ammonium compounds which have groups of some length such as those greater than about 6 carbon atoms in the chains attached to nitrogen, will be used principally when the quaternary ammonium group is to be left upon the fiber to be treated, or where the product is not to be decomposed. In this event the characteristics of the quaternary ammonium groups will serve beneficially in the products and in the materials treated with or made from the products. Compounds having such long chains are also preferred where it is desired to have the organo silanolates in such a form that they can be applied in organic solvents or as aqueous emulsions or dispersions, and as will be noted further hereinafter, compounds of a waxy character can be used as such for the unique combination of waxy and ionic properties which they afford.

A preferred group of quaternary ammonium ions for use according to the present invention are those which are especially adapted to provide silanolates which are soluble or readily dispersible in water or in mixtures of water with organic solvents. These generally are compounds in which the carbon chains are somewhat shorter. More specifically, the preferred quaternary ammonium ions are those in which each organic substituent, $R_1$, $R_2$, $R_3$, and $R_4$, on the nitrogen atom contains no carbon atom further removed from the nitrogen than five consecutive carbon atoms and in which the total number of carbon atoms in the four substituent groups is not in excess of sixteen.

If the organic group is the normal amyl group, for example, the terminal carbon atom is 5 consecutive carbon atoms removed from the point of attachment. In the case of a phenyl group the carbon of the benzene ring in the para position is only four carbon atoms removed from the point of attachment because the carbons may be counted in either direction around the ring. Similarly, a benzyl group containing a methyl substituent on the ring comes within the definition above given.

For the preparation of water soluble quaternary ammonium silanolates, quaternary ammonium ions should be employed in which there are no more than about 16 carbon atoms per quaternary group. The smallest possible quaternary ion will ordinarily be preferred for the sake of economy, and thus methyl and ethyl substituent groups are most preferred for those uses where the quaternary ion is to be removed after application of a silanolate according to the invention.

Quaternary ammonium bases substituted with polyethylene oxide groups can be employed. Tetraethanol ammonium base is especially preferred in some applications because of the low temperature at which the quaternary ammonium ion can be destroyed. Among the quaternary ammonium bases which can be used are those in which the substituents on the nitrogen are aliphatic, alicyclic, aromatic or heterocyclic groups. The groups can all be the same, or can be different. Specific quaternary ammonium hydroxides which can be used are those in which the substituents are: Tetramethyl, tetraethyl, tetraisopropyl, tetra-n-propyl, tetraisobutyl, tetra-n-butyl, or combinations of the foregoing, methyl-triamyl, dimethyl-diamyl, dimethyl-diallyl, benzyltrimethyl, tetraethanol, trimethylethanol, phenyltrimethyl, trimethylcyclohexyl, n-methylpyridinium, n,n-dimethyl piperidinium, n-n-dimethylmorpholinium.

The silanolate groups are also well known in other types of compositions and any of the organo silanolate groups known in the art can be employed with quaternary ammonium groups as above described.

It is to be noted that as the organo groups $R_1$, $R_2$, $R_3$, and $R_4$, are described in accordance with customary terminology as N-organo groups, so from time to time hereinafter the organic groups on the silicon of the silanolate may be called Si-organo groups.

In the Formulas 1, 2, and 3 above noted, the Si-organo group $R_5$ can be any monovalent organic group. It is preferred that the organic group have no more than about 20 carbon atoms.

$R_6$ can be either a hydroxyl, OH group, or it can be an organic group as is $R_5$. If $R_6$ is hydroxyl, the silanolate will be a mono-organo silanolate since there will be only one Si-organo group per silica. It is further to be observed that in the mono-organo silanolates where $R_6$ is hydroxyl that the OH may, as in Formula 3, take part in an interpolymerization to form a silicon-oxygen silicon, Si—O—Si, linkage. The mon-organo silanolates are for many purposes preferred.

The Si-organo groups, $R_5$ and $R_6$, can be substituted organic groups. Thus, they can be hydrocarbon groups in which hydrogen is substituted with fluorine or another halogen. Substituents which tend to weaken the silicon-carbon linkage should preferably be avoided since as is well understood, such compounds would not be stable in the silanolate form.

While as has been said it is preferred that the number of carbon atoms in the Si-organo substituent groups be less than 20, it is still more preferred that the total number of carbon atoms in the groups attached to a single silicon be no greater than 20.

The Si-organo groups $R_5$ and $R_6$ may be aromatic, aliphatic or cycloaliphatic, saturated or unsaturated, monovalent radicals. The types of groups which can be attached to silicon are well known and are, for example, tabulated in Chemistry of the Silicones, 2nd edition, by E. G. Rochow, published by John Wiley and Sons, New York, 1951.

While as has been observed any substituted or unsubstituted group may be used for the Si-organo radicals $R_5$ and $R_6$, it is preferred to use an unsaturated hydrocarbon radical. It is specifically preferred, for instance, to have at least one unsaturated Si-organo radical attached to silicon and to have a total of no more than about eight carbon atoms in the groups attached to a single silicon atom. Preferred such unsaturated groups are vinyl and allyl.

Examples of quaternary ammonium organo silanolates are, of course, readily visualized from the above description of the quaternary ammonium and the silanolate ions. There can be made, for example, according to the invention:

Tetramethyl ammonium monovinyl silanolate.
Tetramethyl ammonium divinyl silanolate.
Tetramethyl ammonium monoallyl silanolate.
Tetramethyl ammonium methylallyl silanolate.
Tetramethyl ammonium monomethyl silanolate.
Tetramethyl ammonium dimethyl silanolate.
Tetramethyl ammonium methylethyl silanolate.
Tetramethyl ammonium methylphenyl silanolate.
Tetramethyl ammonium ethylphenyl silanolate.
Tetramethyl ammonium monobenzyl silanolate.
Tetramethyl ammonium methylbenzyl silanolate.
Tetramethyl ammonium ethylbenzyl silanolate.
Tetramethyl ammonium vinylbenzyl silanolate.
Tetramethyl ammonium vinylphenyl silanolate.
Tetramethyl ammonium monobutyl silanolate.
Tetramethyl ammonium mono-octyl silanolate.
Tetramethyl ammonium monododecyl silanolate.
Tetramethyl ammonium mono-octadecyl silanolate.
Tetramethyl ammonium methyloctadecyl silanolate.
Tetramethyl ammonium para-chlorophenyl silanolate.
Tetramethyl ammonium methyl-2,4-chlorophenyl silanolate.
Tetramethyl ammonium dioctadecyl silanolate.
Tetra ethanol ammonium monovinyl silanolate.
Tetra ethanol ammonium divinyl silanolate
Tetra ethanol ammonium monoallyl silanolate.
Tetra ethanol ammonium methylallyl silanolate.
Tetra ethanol ammonium monomethyl silanolate.
Tetra ethanol ammonium dimethyl silanolate.
Tetra ethanol ammonium methylethyl silanolate
Tetra ethanol ammonium methylphenyl silanolate.
Tetra ethanol ammonium ethylphenyl silanolate
Tetra ethanol ammonium monobenzyl silanolate.
Tetra ethanol ammonium methylbenzyl silanolate.
Tetra ethanol ammonium ethylbenzyl silanolate.
Tetra ethanol ammonium vinylbenzyl silanolate
Tetra ethanol ammonium vinylphenyl silanolate
Tetra ethanol ammonium monobutyl silanolate
Tetra ethanol ammonium mono-octyl silanolate
Tetra ethanol ammonium monododecyl silanolate.
Tetra ethanol ammonium mono-octadecyl silanolate
Tetra ethanol ammonium methyloctadecyl silanolate.
Tetra ethanol ammonium para-chlorophenyl silanolate.
Tetra ethanol ammonium dioctadecyl silanolate.
Butyl trimethyl ammonium monovinyl silanolate.
Butyl trimethyl ammonium divinyl silanolate.
Butyl trimethyl ammonium monoallyl silanolate.
Butyl trimethyl ammonium methylallyl silanolate.
Butyl trimethyl ammonium monomethyl silanolate.
Butyl trimethyl ammonium dimethyl silanolate.
Butyl trimethyl ammonium methylethyl silanolate.
Butyl trimethyl ammonium methylphenyl silanolate.
Butyl trimethyl ammonium ethylphenyl silanolate.
Butyl trimethyl ammonium monobenzyl silanolate.
Butyl trimethyl ammonium methylbenzyl silanolate.
Butyl trimethyl ammonium ethylbenzyl silanolate.
Butyl trimethyl ammonium vinylbenzyl silanolate.
Butyl trimethyl ammonium vinylphenyl silanolate.
Butyl trimethyl ammonium monobutyl silanolate.
Butyl trimethyl ammonium mono-octyl silanolate.
Butyl trimethyl ammonium monododecyl silanolate.
Butyl trimethyl ammonium mono-octadecyl silanolate.
Butyl trimethyl ammonium methyloctadecyl silanolate.
Butyl trimethyl ammonium para-chlorophenyl silanolate.
Butyl trimethyl ammonium methyl-2,4-chlorophenyl silanolate.
Butyl trimethyl ammonium dioctadecyl silanolate.
Butyl trimethyl ammonium monomethyl silanolate.
Butyl trimethyl ammonium dimethyl silanolate.
Butyl trimethyl ammonium monovinyl silanolate.
Butyl trimethyl ammonium methylvinyl silanolate.
Butyl trimethyl ammonium monophenyl silanolate.
Butyl trimethyl ammonium monobenzyl silanolate.
Butyl trimethyl ammonium octadecyl silanolate.
Butyl trimethyl ammonium monomethyl silanolate.
Butyl trimethyl ammonium monovinyl silanolate.
Butyl trimethyl ammonium mono-octadecyl silanolate.
Dodecylpyridinium monoethyl silanolate.
Dodecylpyridinium monophenyl silanolate.
Dodecylpyridinium monovinyl silanolate.
Dodecylpyridinium octadecyl silanolate.
Octadecyltrimethyl ammonium monovinyl silanolate.
Choline monovinyl silanolate.
Choline monomethyl silanolate.

In the preparation of the products of the invention, one can either react the free quaternary ammonium base with the unpolymerized organo silane or the condensation products thereof. Thus the hydrolysis products of vinyltrichlorosilane can be dissolved in a mixture of water and alcohol containing tetramethyl ammonium hydroxide.

A second method which may be used for preparing products of the invention is first to prepare a silanolate, such as sodium methyl silanolate, or potassium silanolate. These react with a quaternary ammonium salt, such as tetramethyl ammonium chloride, in a relatively anhydrous solution of a polar organic solvent, such as ethyl alcohol, in which the resulting metal salt such as sodium chloride is insoluble and is precipitated and may be removed.

The organo chlorosilanes corresponding to the organo silanolates which are to be prepared may be dissolved directly in an alcoholic solution of the free quaternary ammonium base. This produces a mixture of the quaternary ammonium chloride and the quaternary silanolate.

In the case of the quaternary ammonium silanolates containing long hydrocarbon chains in either the quaternary ammonium ion or in the silanolate ion so that the products are relatively insoluble in water, the desired product is readily formed by the above methods and yields a precipitate which can readily be recovered from the reaction mixture by filtration. It will be observed that these products can, if desired, be formed into aqueous dispersions or can be solublized by the use of suitable organic solvents.

The organic silanolate of a more stable quaternary ammonium base can be prepared from the silanolate of a less stable ammonium base by adding the more stable quaternary ammonium hydroxide to the solution of the less stable quaternary ammonium silanolate and then heating to decompose the less stable quaternary ammonium ion. Thus, for instance, to prepare such a product as tetrabutyl ammonium monomethyl silanolate one may begin with tetraethanol ammonium monomethyl silanolate and proceed as just described.

Water soluble unsaturated silanolates in the form of their alkali metal salts, such as sodium and potassium, can be used for the preparation of corresponding quaternary ammonium silanolates. These water soluble compounds are readily handled and this technique will be found especially useful with the monovinyl or divinyl, the allyl or diallyl, silanolates. It can be observed in passing that these materials themselves can be used for impregnating and treating various fibers such as even glass fibers but an alkali is left which tends to weaken the fibers and, in this event, they must be treated as with an acid gas such as carbon dioxide or acetic acid vapors.

In choosing the proportions of the quaternary ammonium ion and the silanolate it can be seen from the formulas above given that the ratio should be at least one quaternary ammonium ion for each silicon atom in the silanolate. It is preferred, usually, to use a somewhat greater proportion of the quaternary ammonium base than this in order to insure a relatively low degree of polymerization with silanolate, especially when the solution is diluted to 1 or 2 per cent solids for such applications as treating glass fibers. The excess can run up to 50 or 100 per cent excess over that indicated or, of course, even more can be used.

In carrying out the reactions as above described for preparing products of the invention, one can ordinarily use room temperatures though somewhat higher temperatures will usually shorten the reaction time. However, the temperature used should not be so high as to result in the decomposition of the quaternary ammonium ion.

The quaternary ammonium organo silanolates of the invention can be used as such. Thus the longer chain compounds can be used as anti-static agents on synthetic fibers. They can be used in waxes and polishes and as dispersing and emulsifying agents.

It is to be noted that generally where the quaternary ammonium ion groups are small, such as tetramethyl ammonium, and the silanolate groups are large, such as octadecyl silanolate, then aqueous solutions show marked surface activity, especially at a pH above about 10.5.

Dispersions of the products, from those having quite short chain lengths up to those of long chain lengths, can be used advantageously for sizing, and particularly for the treatment of textiles and finely divided materials generally to add lubricity and water proofness. The greatest advantages of the uses of such products according to the invention are, as has already been indicated generally above, in connection with the treatment of siliceous materials and more especially in connection with the treatment of glass.

The long chain quaternary ammonium compounds such as octadecyl trimethyl ammonium monomethyl silanolate have the unique property of being converted to a highly hydrophobic, water insoluble film when dried on the surface of glass or textiles.

It will of course be evident that mixtures of quaternary ammonium organo silanolates of various types may be used according to the invention. Thus a small amount of a long chain quaternary ammonium organo silanolate can be mixed with a short chain quaternary ammonium organo silanolate such as the tetramethyl quaternary ammonium organo silanolate. This will impart a degree of lubricity without detracting from the bonding properties of the surfaces treated.

Among the siliceous materials which can be treated are finely divided silica powders, silica gels, asbestos, clays, and the like.

Glass surfaces can very advantageously be treated and especially good results are obtained with glass fibers. In the treatment of glass fibers an aqueous solution or dispersion of one of the products as previously described can be applied directly to the thoroughly cleaned glass fibers and dried. The products can be applied to textiles, they can be combined with sizes, binders, and lubricants for application, for example, to the fibers as they emerge from the spinnerets and before the fibers are gathered together into a strand, thus permitting complete coating of the individual fibers.

The quaternary ammonium organo silanolates can be left upon the surfaces of the textiles, fibers, glass fibers, or glass or other material treated as above described. In this event a coating such as that illustrated in Figures 1 and 3 of the drawing will be obtained. This will be especially advantageous when the N-organo groups are above about 6 carbon atoms. The products so coated may be articles of commerce for further processing and treatment. According to a preferred aspect of the invention, however, it is preferred that the N-organo groups be shorter in length, as has been previously noted, and that the quaternary ammonium groups be removed from the coating as illustrated in Figures 2 and 4 of the drawings. Thus glass fibers treated with tetramethyl quaternary ammonium vinyl silanolate can be applied from water to glass fibers, the coating dried and then heated to a temperature of about 150° C.

Glass fibers, and other materials as well, which have been treated with the quaternary ammonium organic silanolates, either with or without the heat treatment to drive off the quaternary ammonium groups, can be used for reinforcing various types of plastic laminates and plastics. Particularly great advantage will be found in treating fibers, such as glass, or even glass surfaces with a quaternary ammonium organo silanolate which carries as at least one of the Si-organo groups a radical, ordinarily an unsaturated radical, which is reactive with the particular polymer or plastic which will be used in making the final product. Thus, if a polyester type of resin containing ethylenically unsaturated groupings is used, the silanolate should contain at least one Si-organo group which is ethylenically unsaturated, such as a vinyl group.

In order that the invention may be better understood, the following specific illustrative examples are given in addition to those already generally described.

EXAMPLE 1

This is an example of the preparation of tetramethyl ammonium vinyl silanolate.

An aqueous solution of the desired compound was prepared as follows:

One mol of vinyltrichlorosilane was hydrolized by reaction with tertiary butyl alcohol under reduced pressure. The vinyltrichlorosilane was added to the tertiary butyl alcohol in a glass reaction vessel while the alcohol was held under reflux at reduced pressure. The tertiary butyl chloride formed in the reaction mixture was distilled off until the temperature at the top of the distillation column increased 15° C. higher than the boiling point of tertiary butyl chloride. Titration of the distillate for chloride ions indicated that 92 per cent of the chloride originally present in the trichlorosilane had been removed from the reaction mixture.

Half of the reaction mixture was then mixed with 455 mls. of 1.1 normal tetramethyl ammonium hydroxide, thus giving a mixture in which there was 1.1 mols of tetramethyl ammonium ion per atomic weight of silicon. The reaction between the tetramethyl ammonium hydroxide and the reaction product of the trichlorosilane with tertiary butyl alcohol was slightly exothermic. The reaction mixture separated into two liquid phases and a precipitate was slowly formed in the upper layer. The mixture was held at 55° C. for 4 hours and 30 minutes.

The reaction mixture was removed from the reaction vessel and the lower liquid phase was separated from the upper phase and butanol was removed by evaporation until the liquid was essentially free of this solvent. The resulting aqueous solution, which was diluted by some water during the evaporation of the butanol, was found to contain about 13 per cent by weight of solids, when the solution was evaporated to dryness on the steam bath. Analysis of this solution showed that it contained tetramethyl ammonium vinyl silanolate.

Analysis for silicon and determination of the unsaturated groups present in the solution by measuring the iodine number showed that there was present one unsaturated group for each silicon atom present in the solution. This indicated that there had been no decomposition of the vinyl silanolate during its formation. Equivalents of tetramethyl ammonium ion per atomic weight of silicon, corresponded to a ratio of nitrogen to silicon of 1.66:1.0.

The aqueous solution thus prepared was used for the treatment of glass fibers in the following manner: Heat-cleaned glass fabric was soaked in a solution of the tetramethyl ammonium vinyl silanolate which had been diluted to a concentration of 2 per cent by weight of solids and which had a pH of 11.56.

The fabric was heated in an oven at 150° C. for about 20 minutes, washed in distilled water, dried at 150° C. and then fabricated into a laminated plastic sheet by impregnating it with a low pressure polyester type resin, and then formed into a laminated plastic by mixing with a polyester-type resin, together with benzoyl peroxide catalyst and molded in customary manner. The molded plastic laminate was clear, strong and transparent.

EXAMPLE 2

The preparation of tetramethyl ammonium vinyl silanolate from the corresponding sodium vinyl silanolate was carried out as follows:

The sodium salt was formed in the same manner as the tetramethyl ammonium salt in Example 1, by using a solution of sodium hydroxide having the same normality as the solution of tetra methyl ammonium hydroxide in Example 1. However, after the reaction had ceased, the two liquid layers were not separated, but instead tertiary-butyl alcohol was continuously added to the reactor and water was removed by azeotropic distillation until the sodium salt was obtained as a viscous white gum. Most of the tertiarybutyl alcohol was then distilled from the reaction vessel.

Methanol was added and an amount of tetramethyl ammonium chloride equivalent to the sodium ion in the sodium salt was then added and the mixture stirred. There was formed a fine white precipitate of sodium chloride, which was removed from the solution by filtration, leaving a solution of tetramethyl ammonium vinyl silanolate.

EXAMPLE 3

Thirty grams of a solution of tetramethyl ammonium vinyl silanolate obtained by the process of Example 1 and containing 13.4 percent solids was mixed with 25 milliliters of water containing 16.5 grams of tetradecyltrimethyl ammonium chloride. The mixture remained clear. Upon adding normal butyl alcohol in the amount of 25 milliliters and 15 grams of sodium chloride, the tetradecyltrimethyl ammonium vinyl silanolate was salted out into the upper butanol liquid layer from which it was recovered as a waxy solid by evaporation of the butanol. The product was applied to glass and gave a hydrophobic waxy surface.

Using the methods as described in the foregoing specific examples, the various quaternary ammonium organo silanolates heretofore described can in similar manner be prepared using the appropriate quaternary ammonium bases or salts and the appropriate organo silane derivatives.

I claim:

1. A quaternary ammonium organo silanolate with a quaternary ammonium:Si ratio of from 1:1 to 2:1 and having up to two hydrocarbon groups directly attached to each silicon atom, the total number of carbon atoms in each such group attached to silicon being no greater than eight and the silicon atom carrying at least one aliphatic, unsaturated Si-organo group, the quaternary ammonium ion having four substituent groups each containing no carbon atom further removed from the nitrogen than five consecutive carbon atoms and the total number of carbon atoms in the four substituent groups being not in excess of sixteen.

2. A quaternary ammonium organo silanolate with a quaternary ammonium:Si ratio of at least 1:1 and having up to two organo groups directly attached to each silicon atom, the total number of carbon atoms in each such group attached to silicon being no greater than eight and the silicon atom carrying at least one aliphatic Si-organo group, the quaternary ammonium ion having four substituent groups each containing no carbon atom further removed from the nitrogen than five consecutive carbon atoms and the total number of carbon atoms in the four substituent groups being not in excess of sixteen.

3. A quaternary ammonium mono-vinyl silanolate, with a quaternary ammonium:Si ratio of from 1:1 to 2:1, the quaternary ammonium ion having four substituent groups each containing no carbon atom further removed from the nitrogen than five consecutive carbon atoms and the total number of carbon atoms in the four substituent groups being not in excess of sixteen.

4. Tetra methyl ammonium mono-vinyl silanolate having a quaternary ammonium:Si ratio of from 1:1 to 2:1.

5. In a process for modifying a glass surface the step comprising treating said surface with an aqueous dispersion of a quaternary ammonium organo silanolate with a quaternary ammonium:Si ratio of from 1:1 to 2:1 and having up to two hydrocarbon groups directly attached to each silicon atom, the total number of carbon atoms in each such group attached to silicon being no greater than eight and the silicon atom carrying at least one aliphatic, unsaturated Si-organo group, the quaternary ammonium ion having four substituent groups each containing no carbon atom further removed from the nitrogen than five consecutive carbon atoms and the total number of carbon atoms in the four substituent groups being not in excess of sixteen.

6. In a process for modifying a glass surface the steps comprising treating said surface with an aqueous dispersion of a quaternary ammonium organo silanolate with a quaternary ammonium:Si ratio of at least 1:1 and having up to two organo groups directly attached to each silicon atom, the total number of carbon atoms in each such group attached to silicon being no greater than eight and the silicon atom carrying at least one aliphatic Si-organo group, the quaternary ammonium ion having four substituent groups each containing no carbon atom further removed from the nitrogen than five consecutive carbon atoms and the total number of carbon atoms in the four substituent groups being not in excess of sixteen, and heating the treated surface to volatilize ammonium base.

7. Glass fibers having a coating of a quaternary ammonium organo silanolate with a quaternary ammonium:Si ratio of from 1:1 to 2:1 and having up to two hydrocarbon groups directly attached to each silicon atom, the total number of carbon atoms in each such group attached to silicon being no greater than eight and the silicon atom carrying at least one aliphatic, unsaturated Si-organo group, the quaternary ammonium ion having four substituent groups each containing no carbon atom further removed from the nitrogen than five consecutive carbon atoms and the total number of carbon atoms in the four substituent groups being not in excess of sixteen.

8. An article comprised of an organic plastic bonded to a siliceous material, the bond being improved by a coating on the siliceous material of a quaternary ammonium organo silanolate with a quaternary ammonium:Si ratio of from 1:1 to 2:1 and having up to two hydrocarbon groups directly attached to each silicon atom, the total number of carbon atoms in each such group attached to silicon being no greater than eight and the silicon atom carrying at least one aliphatic unsaturated Si-organo group, the quaternary ammonium ion having four substituent groups each containing no carbon atom further removed from the nitrogen than five consecutive carbon atoms and the total number of carbon atoms in the four substituent groups being not in excess of sixteen.

9. A quaternary ammonium organo silanolate with a quaternary ammonium:Si ratio of from 1:1 to 2:1 and having one unsaturated, aliphatic hydrocarbon Si-organo group with no more than eight carbon atoms attached to each silicon atom, the quaternary ammonium ion having four substituent groups each containing no carbon atom further removed from the nitrogen than five consecutive carbon atoms and the total number of carbon atoms in the four substituent groups being not in excess of sixteen.

10. In a process for modifying a glass surface the step comprising treating said surface with an aqueous dispersion of a quaternary ammonium organo silanolate with a quaternary ammonium:Si ratio of from 1:1 to 2:1 and having up to two hydrocarbon groups directly attached to each silicon atom, the total number of carbon atoms in each such group attached to silicon being no greater than eight and the silicon atom carrying at least one aliphatic, unsaturated Si-organo group, the quaternary ammonium ion having four substituent groups each containing no carbon atom further removed from the nitrogen than five consecutive carbon atoms and the total number of carbon atoms in the four substituent groups being not in excess of sixteen, and heating the treated surface to volatilize ammonium base.

11. In a process for modifying a glass surface the steps comprising treating said surface with an aqueous dispersion of a quaternary ammonium mono-vinyl silanolate with a quaternary ammonium:Si ratio of from 1:1 to 2:1, the quaternary ammonium ion having four substituent groups each containing no carbon atom further removed from the nitrogen than five consecutive carbon atoms and the total number of carbon atoms in the four substituent groups being not in excess of sixteen, and heating the treated surface to volatilize ammonium base.

References Cited in the file of this patent

UNITED STATES PATENTS

| 2,438,055 | Hyde | Mar. 16, 1948 |
| 2,441,422 | Krieble | May 11, 1948 |
| 2,563,288 | Steinman | Aug. 7, 1951 |
| 2,587,636 | MacMullen | Mar. 4, 1952 |

OTHER REFERENCES

Hurd: "Journal Amer. Chem. Soc.," vol. 67 (1945), pp. 1813, 1814.